(12) United States Patent
Nakamura (10) Patent No.: US 8,029,400 B2
(45) Date of Patent: Oct. 4, 2011

(54) CENTER CRANK ECCENTRICALLY OSCILLATING SPEED REDUCER

(75) Inventor: Koji Nakamura, Tsu (JP)

(73) Assignee: Nabtesco Corporation, Tokyo (JP)

( * ) Notice: Subject to any disclaimer, the term of this patent is extended or adjusted under 35 U.S.C. 154(b) by 895 days.

(21) Appl. No.: 12/064,299

(22) PCT Filed: Aug. 22, 2006

(86) PCT No.: PCT/JP2006/316361
§ 371 (c)(1),
(2), (4) Date: Feb. 20, 2008

(87) PCT Pub. No.: WO2007/023783
PCT Pub. Date: Mar. 1, 2007

(65) Prior Publication Data
US 2010/0179013 A1 Jul. 15, 2010

(30) Foreign Application Priority Data
Aug. 22, 2005 (JP) .............................. P2005-239669

(51) Int. Cl.
*F16H 1/32* (2006.01)

(52) U.S. Cl. ...................................... 475/162
(58) Field of Classification Search .................. 475/162, 475/178
See application file for complete search history.

(56) References Cited

U.S. PATENT DOCUMENTS

| | | | |
|---|---|---|---|
| 2003/0054912 A1* | 3/2003 | Nohara et al. | 475/162 |
| 2004/0192486 A1 | 9/2004 | Tsurumi et al. | |

FOREIGN PATENT DOCUMENTS

| | | |
|---|---|---|
| JP | 63-270946 A | 11/1988 |
| JP | 7124883 A | 5/1995 |
| JP | 2000-065162 A | 3/2000 |
| JP | 2001-187945 A | 7/2001 |
| JP | 2003-262256 A | 9/2003 |
| JP | 2004-092739 A | 3/2004 |

OTHER PUBLICATIONS

EP Supplemental Search Report issued on Jun. 18, 2010 in EP Application No. 06782865.7.

* cited by examiner

*Primary Examiner* — Edwin A Young
(74) *Attorney, Agent, or Firm* — Panitch Schwarze Belisario & Nadel LLP (57) ABSTRACT

The present invention provides a center crank eccentrically oscillating speed reducer enabled to increase the available cross-sectional area of a hollow hole, while the generation of large noises is suppressed, as compared with the conventional center crank eccentrically oscillating speed reducer. An eccentrically oscillating speed reducer (100) includes a case (110) configured to have internal teeth (111), a hollow crankshaft 120 configured to have an external gear 123, external gears 131 and (131) have external teeth 131a and 132a a carrier 140, and a transmission gear (160) configured to mesh with an input gear (150) and the external gear (123) and to transmit power transmitted from the input gear (150) to the external gear (123).

4 Claims, 9 Drawing Sheets

CENTER CRANK ECCENTRICALLY OSCILLATING SPEED REDUCER

CROSS-REFERENCE TO RELATED APPLICATION

This application is a section 371 of International Application No. PCT/JP2006/316361, filed Aug. 22, 2006, which was published in the Japanese language on Mar. 1, 2007 under International Publication No. WO 2007/023783 A1 and the disclosure of which is incorporated herein by reference.

TECHNICAL FIELD

The present invention relates to a center crank eccentrically oscillating speed reducer in which a crankshaft in which a hollow hole is formed is disposed substantially at a center thereof.

BACKGROUND ART

As a conventional center crank eccentrically oscillating speed reducer, there is known a speed reducer having an output portion configured so that pins are embedded at uniform intervals in an inner peripheral part, a camshaft configured to have a gear, to be disposed at a substantially center of the pins of the output portion, and to rotate with respect to the output portion, a toothed disk configured to have external teeth meshing with the pins of the output portion, to engage with the camshaft, and to be eccentrically moved by the camshaft, and a housing configured to have output pins engaging with the toothed disk. Power is transmitted from a motor to the gear of the camshaft (see, e.g., Patent Document 1).

Patent Document 1: JP-A-2000-65162 (pages 2 and 3 and FIG. 1).

DISCLOSURE OF THE INVENTION

Problems that the Invention is to Solve

However, in the conventional center crank eccentrically oscillating speed reducer, power is transmitted directly to the gear of the camshaft from an input gear attached to an output shaft of the motor after the input gear and the gear of the camshaft mesh with each other. Thus, in a case where the diameter of the gear of the camshaft is small, a part of a hollow hole is blocked up by the motor. Thus, the conventional center crank eccentrically oscillating speed reducer has a problem in that the available cross-sectional area of the hollow hole is reduced.

Incidentally, in a case where the diameter of the gear of the camshaft is large, a part of the motor is prevented from blocking off apart of the hollow hole of the clank shaft. However, the circumferential speed of the gear of the camshaft makes high. This causes an additional problem that tapping noises due to the mesh between the input gear and the camshaft makes large.

The invention is accomplished to solve the problems of the conventional center crank eccentrically oscillating speed reducer. An object of the invention is to provide a center crank eccentrically oscillating speed reducer enabled to increase the available cross-sectional area of a hollow hole, while the generation of large noises is suppressed, as compared with the conventional one.

Means for Solving the Problems

A center crank eccentrically oscillating speed reducer according to the invention has a configuration that includes a first member configured to have internal teeth, a hollow crankshaft configured to have an external gear, to be disposed at a substantially center of the internal teeth, and to rotate with respect to the first member, an external gear member configured to have external teeth meshing with the internal teeth, to engage with the crankshaft and to be eccentrically moved by the crankshaft, a second member configured to engage with the external gear and to be rotated by the external gear with respect to the first member, and a transmission gear configured to mesh with an input gear and the external gear and to transmit power transmitted from the input gear to the external gear. The configuration is adapted so that the transmission gear is rotatably supported by the second member.

With this configuration, the center crank eccentrically oscillating speed reducer according to the invention can separate the input gear, which is attached to an output shaft of a motor, apart from the external gear of the crankshaft. Thus, the distance between the centers of the motor and a hollow hole of the crankshaft can be increased, as compared with that in the case of the conventional one. Accordingly, the center crank eccentrically oscillating speed reducer according to the invention can reduce the cross-sectional area of a part of the hollow hole of the crankshaft, which is cross-sectionally blocked off by the motor, as compared with the conventional one. Consequently, the center crank eccentrically oscillating speed reducer according to the invention can increase the available cross-sectional area of the hollow hole, as compared with the conventional one. Additionally, because the center crank eccentrically oscillating speed reducer according to the invention can reduce the cross-sectional area of a part of the hollow hole of the crankshaft, which is cross-sectionally blocked off by the motor, as compared with the conventional one, it is unnecessary to increase the diameter of the external gear of the crankshaft, as compared with the conventional one. Therefore, the center crank eccentrically oscillating speed reducer according to the invention can suppress the tapping noises due to the mesh between the input gear and the camshaft from being turned up. Also, the center crank eccentrically oscillating speed reducer according to the invention can suppress large noises from being generated, as compared with the conventional one.

The center crank eccentrically oscillating speed reducer according to the invention may be configured so that the transmission gear has a torque transmission pin to which torque is transmitted from the external gear member, and that the transmission gear is rotatably supported by the torque transmission pin.

With this configuration, the torque transmission pin performs not only the transmission of torque transmitted from the external member but the support of the transmission gear. Thus, the center crank eccentrically oscillating speed reducer according to the invention can suppress increase in the number of components for supporting the transmission gear.

Further, the center crank eccentrically oscillating speed reducer according to the invention may include a bearing disposed between the transmission gear and the torque transmission pin, and may be configured so that the torque transmission pin is made of a bearing steel material and has a surface that is a rolling contact surface of the bearing.

With this configuration, the center crank eccentrically oscillating speed reducer according to the invention can simplify a structure of the bearing.

Furthermore, the center crank eccentrically oscillating speed reducer according to the invention may have a configuration in which the transmission member is a rotatable external gear train element that has a large-diameter gear which meshes with the input gear and is larger in diameter than the input gear, and that has also a small-diameter gear which meshes with the external gear and is smaller in diameter than the external gear.

With this configuration, the center crank eccentrically oscillating speed reducer according to the invention can more reduce a speed in a front stage. Consequently, the center crank eccentrically oscillating speed reducer according to the invention can obtain a larger speed reduction ratio.

ADVANTAGES OF THE INVENTION

The present invention has an advantage in providing a center crank eccentrically oscillating speed reducer enabled to increase the available cross-sectional area of a hollow hole, while the generation of large noises is suppressed, as compared with the conventional center crank eccentrically oscillating speed reducer.

BEST MODE FOR CARRYING OUT THE INVENTION

Hereinafter, embodiments of the invention are described with reference to the accompanying drawings.

First Embodiment

First, the configuration of a center crank eccentrically oscillating speed reducer speed reducer according to a first embodiment is described.

Figure 1:
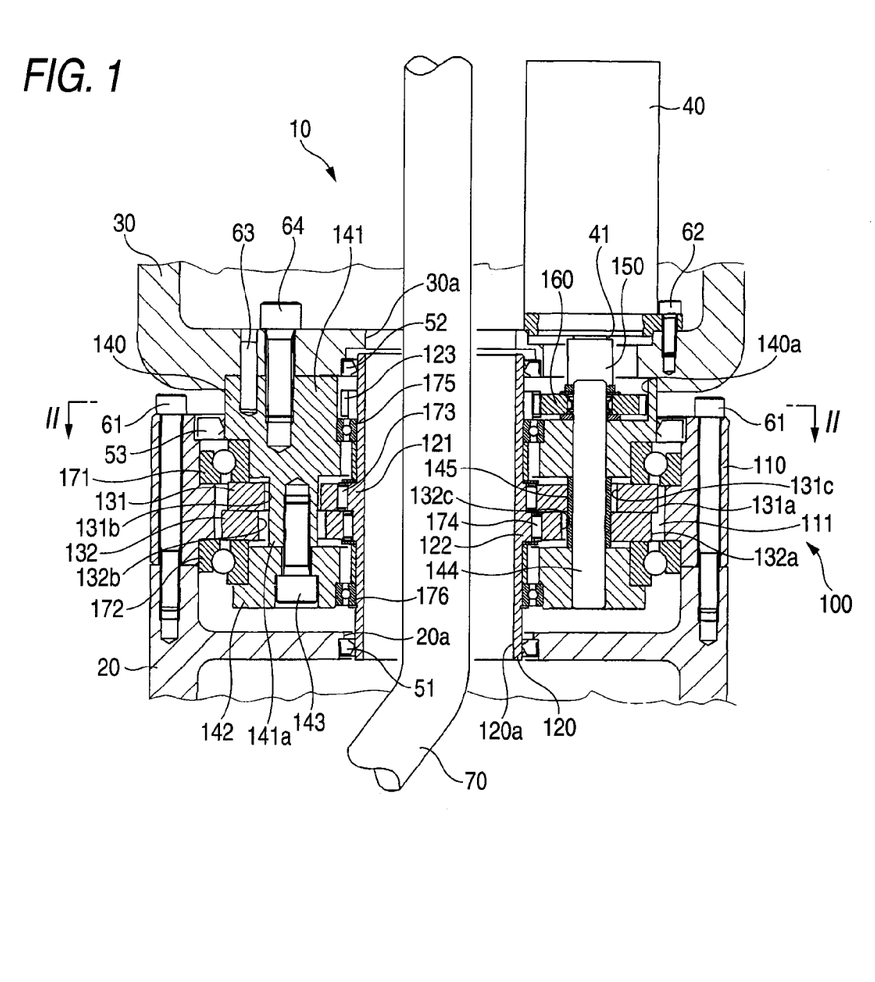
FIG. 1 is a side cross-sectional view illustrating a joint portion of an industrial robot having a center crank eccentrically oscillating speed reducer according to a first embodiment of the invention.

As illustrated in FIG. 1, a joint 10 for use in an industrial robot includes a base 20, a rotating body 30 which rotates with respect to the base 20, a motor 40 which generates power for rotating the rotating body 30, and an eccentrically oscillating speed reducer 100 which serves as a center crank eccentrically oscillating speed reducer according to the present embodiment and which is fixed to the base 20 and the rotating body 30 and reduces power generated by the motor 40 so as to use the reduced power as power for moving the rotating body 30 with respect to the base 20.

The eccentrically oscillating speed reducer 100 includes a case 110 which has internal teeth 111 and serves as a first member, a hollow crankshaft 120 which has an eccentric portion 122 and an external gear 123 and is disposed at a substantially center of the internal teeth 111 and which rotates with respect to the case 110, an external gear 131 which has external teeth 131a meshing with the internal teeth 111 and engages with the eccentric portion 121 of the crankshaft 120 and which is eccentrically moved by the crankshaft 120 and serves as an external gear member, a carrier 140 which engages with the external gear 131 and is rotated by the external gear 131 with respect to the case 110 and which serves as a second member, an input gear 150 mounted on an output shaft 41 of the motor 40, a transmission gear 160 which meshes with the input gear 150 and with the external gear 123 and which transmits to the external gear 123 power having been transmitted from the input gear 150, bearings 171 and 172 which support the carrier 140 rotatably with respect to the case 110, a bearing 173 which supports the external gear 131 rotatably with respect to the crankshaft 120, a bearing 174 which supports the external gear 132 rotatably with respect to the crankshaft 120, and bearings 175 and 176 which support the carrier 140 rotatably with respect to the crankshaft 120.

The crankshaft 120 is inserted into a hole 20a of the base 20 and into a hole 30a of the rotating body 30.

Figure 2:
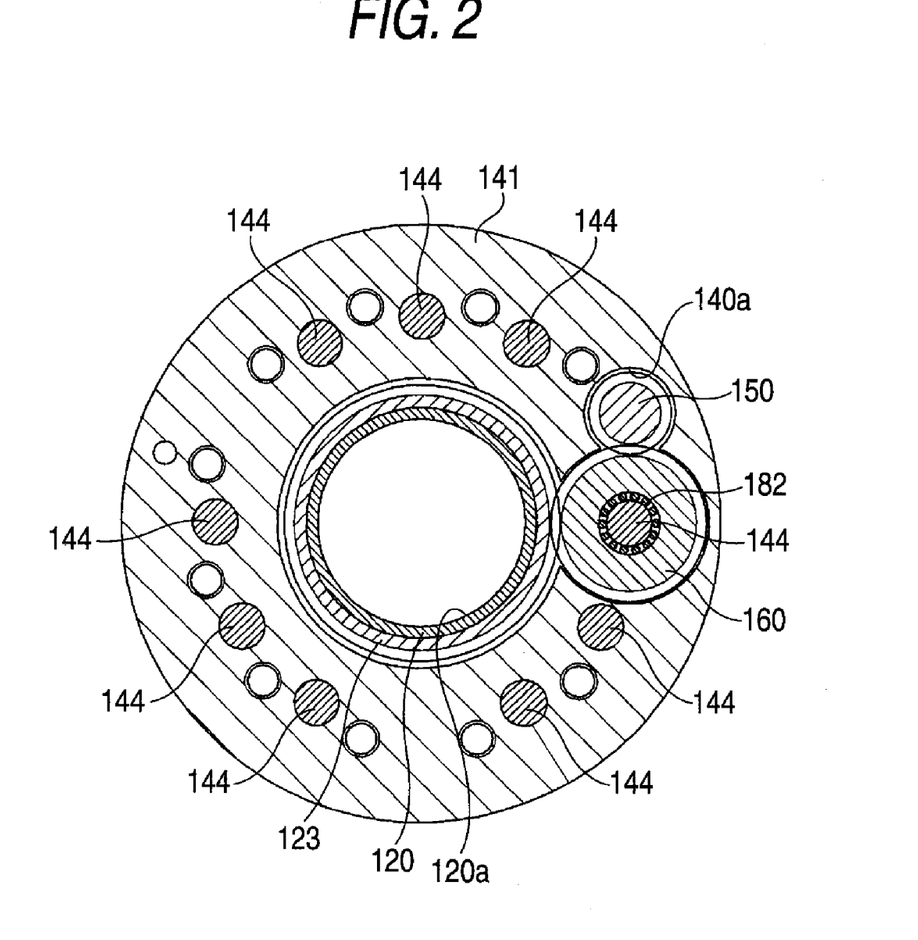
FIG. 2 is a cross-sectional view illustrating a crankshaft, a carrier, an input gear, and a transmission gear of the center crank eccentrically oscillating speed reducer, taken in the direction of arrows II-II shown in FIG. 1.

The carrier 140 includes a disk 141 which has pillar portions 141a to be inserted into a hole 131b of the external gear 131 and a hole 132b of the external gear 132, a disk 142 which is disposed together with the disk 141 so as to be interposed by the external gears 131 and 132, bolts 143 with which the disks 141 and 142 are fastened, torque transmission pins 144 each of which is pressed into the disks 141 and 142 and to each of which torque is transmitted from the external gear 131, and rollers 145 which are inserted into a hole 131c of the external gear 131 and a hole of the external gear 132 and to which the torque transmission pins 144 are rotatably and respectively inserted, to thereby engage with the external gears 131 and 132 and the torque transmission pins 144. The plural pillar portions 141a, the plural bolts 143, the plural torque transmission pins 144, and the plural rollers 145 are disposed on the circumference of a circle centered on an axis of the crankshaft 120. Additionally, as illustrated in FIG. 2, grooves, in which the input gear 150, the transmission gear 160 and the external gear 123 are accommodated, are formed in the carrier 140.

Figure 3:
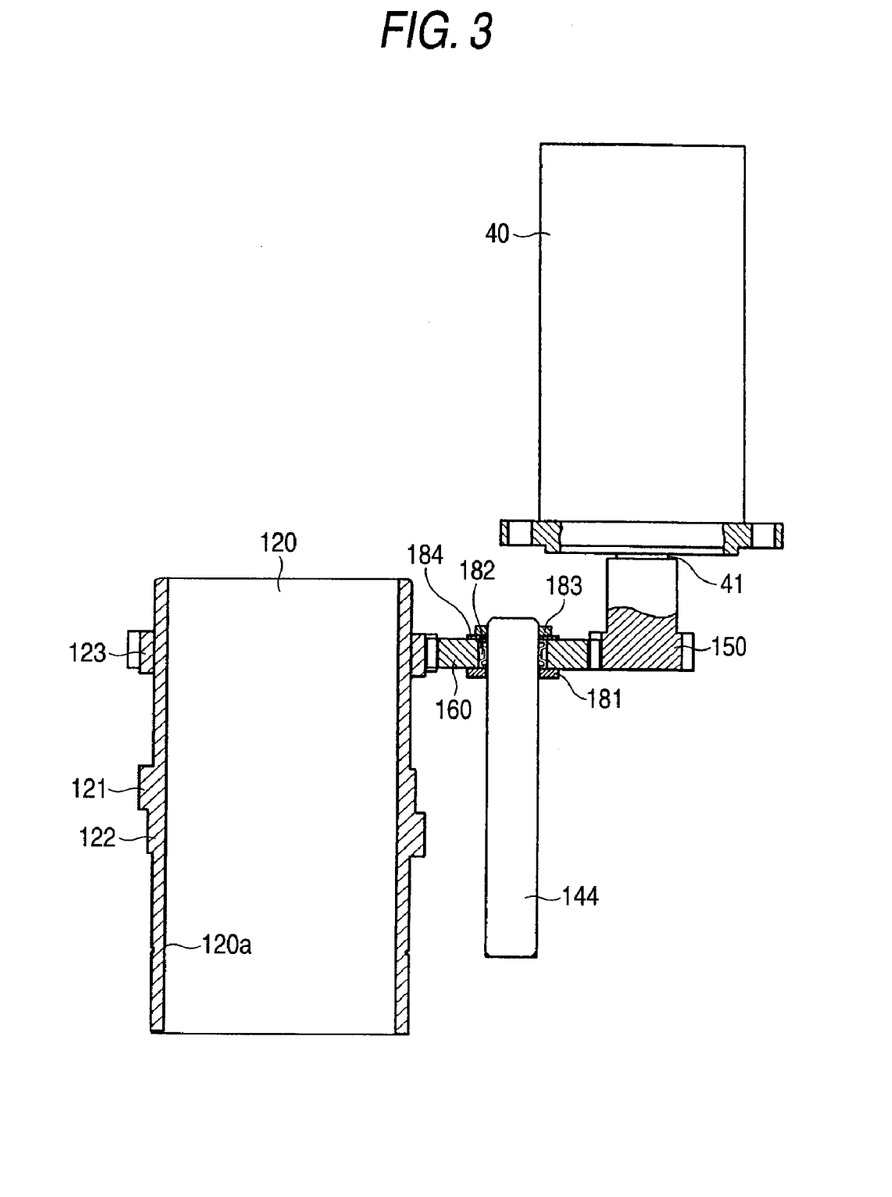
FIG. 3 is a side cross-sectional view illustrating a motor at the joint portion, and the crankshaft, the carrier, the input gear, and the transmission gear of the center crank eccentrically oscillating speed reducer.

Further, as illustrated in FIG. 3, the eccentrically oscillating speed reducer 100 includes a pedestal 181 which is rotatably inserted into the torque transmission pin 144 and prevents the disk 141 (see FIG. 1) and the transmission gear 160 from interfering with each other, a radial bearing 182 which supports the transmission gear 160 rotatably with respect to the torque transmission pin 144, a slip-off preventing element which is pressed into the torque transmission pin 144 and prevents the transmission gear 160 from slipping off the torque transmission pin 144, and a washer 184 which preventing the slip-off preventing element 183 from being worn away due to the contact between the slip-off preventing element 183 and the transmission gear 160. Incidentally, the torque transmission pin 144 is made of a bearing steel material (i.e., a high-carbon chromium bearing steel material, such as SUJ2 material) and has a surface that is a rolling contact surface of the radial bearing 182.

Also, as illustrated in FIG. 1, the joint 10 includes an oil seal 51 which seals the gap between the base 20 and the crankshaft 120, an oil seal 52 which seals the gap between the rotating body 30 and the crankshaft 120, an oil seal 53 which seals the gap between the case 110 and the disk 141, bolts 64 which fix the rotating body 30 and the disk 141, and a wiring 70 which passes through the hole 30a of the rotating body 30 and the hollow hole 120a of the crankshaft 120. Incidentally, the plural bolts 61 and 64 are disposed on the circumference of a circle centered on an axis of the output shaft 41 of the motor 40.

Additionally, the engaging surface between the base 20 and the case 110, the engaging surface between the rotating body 30 and the motor 40, and the engaging surface between the rotating body 30 and the disk 141 are sealed with a seal agent or the like.

Next, an operation of the joint 10 is described.

When the motor 40 generates power, the power generated by the motor 40 is reduced and transmitted to the crankshaft 120 through the input gear 150 and the transmission gear 160 mounted on the output shaft 41 of the motor 40 and the external gear 123 of the crankshaft 120. The transmitted power is further reduced and transmitted to the carrier 140 through the external teeth 131a of the external gear 131, the external teeth 132a of the external gear 132, the internal teeth 111 of the case 110, and the torque transmission pins 144.

Accordingly, the carrier 140 rotates with respect to the case 110. The rotating body 30 fixed to the carrier 140 rotates with respect to the base 20 to which the case 110 is fixed.

Figure 4:
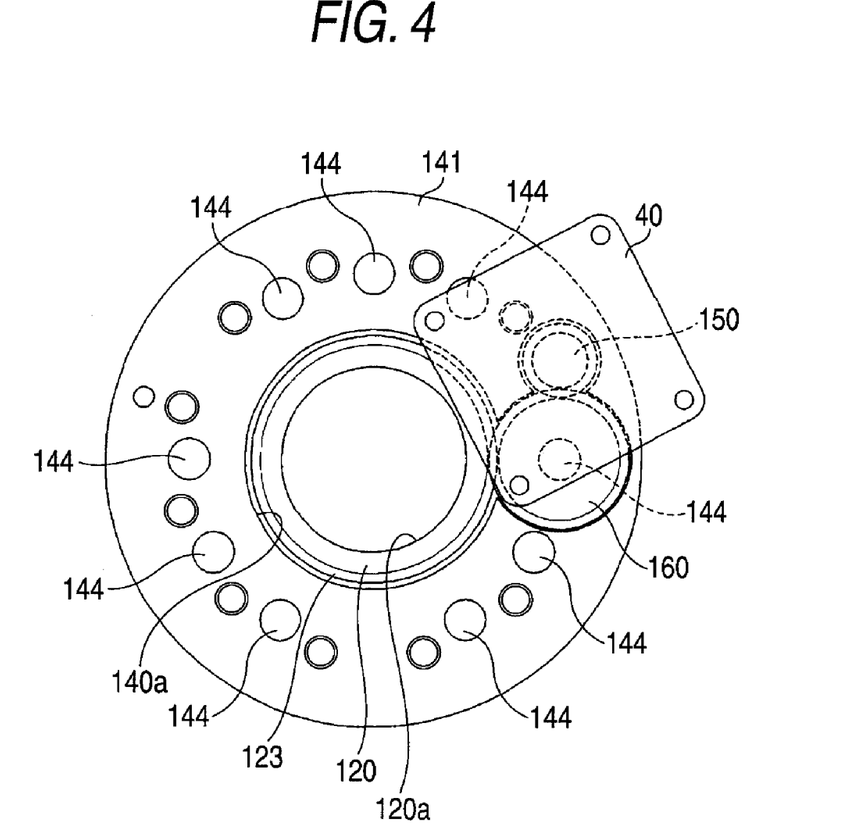
FIG. 4 is a top view illustrating the motor at the joint portion, and the crankshaft, the carrier, the input gear, and the transmission gear of the center crank eccentrically oscillating speed reducer.

As described above, the eccentrically oscillating speed reducer 100 includes the input gear 150 mounted on the output shaft 41 of the motor 40, and the transmission gear 160 which meshes with the external gear 123 of the crankshaft 120 and transmits to the external gear 123 power having been transmitted from the input gear 150. Consequently, the input gear 150 and the external gear 120 can be separated apart from each other. Thus, as illustrated in FIG. 4, the distance between the center of the motor 40 and that of the crankshaft 120 can be increased, as compared with the conventional center crank eccentrically oscillating speed reducer. Accordingly, the eccentrically oscillating speed reducer 100 can reduce the cross-sectional area of a part of the hollow hole 120a of the crankshaft 120, which is cross-sectionally blocked off by the motor 40, as compared with the conventional one. Consequently, the eccentrically oscillating speed reducer 100 can increase the available cross-sectional area of the hollow hole 120a, as compared with the conventional one.

Additionally, because the eccentrically oscillating speed reducer 100 can reduce the cross-sectional area of a part of the hollow hole 120a of the crankshaft 120, which is cross-sectionally blocked off by the motor 40, as compared with the conventional one, it is unnecessary to increase the diameter of the external gear 123 of the crankshaft 120, as compared with the conventional one. Therefore, the eccentrically oscillating speed reducer 100 can suppress the tapping noises due to the mesh between the transmission gear 160 and the external gear 123 from being turned up. Also, the eccentrically oscillating speed reducer 100 can suppress large noises from being generated, as compared with the conventional one.

Further, in the eccentrically oscillating speed reducer 100, the torque transmission pins 144 perform not only the transmission of torque transmitted from the external gears 131 and 132 but the support of the transmission gear 160. Thus, the eccentrically oscillating speed reducer 100 can suppress increase in the number of components for supporting the transmission gear 160. Apparently, as will be described later, in the eccentrically oscillating speed reducer according to the present application, the transmission gear can be supported by a component other than the torque transmission pin 144.

Moreover, the eccentrically oscillating speed reducer 100 is configured so that the torque transmission pin 144 is made of a bearing steel material and has a surface that is a rolling contact surface of the radial bearing 182. Thus, the configuration of the radial bearing 182 can be simplified.

Furthermore, the eccentrically oscillating speed reducer 100 is configured so that the input gear 150, the transmission gear 160 and the external gear 123 are accommodated in the groove 140a of the carrier 140. Thus, the length of the eccentrically oscillating speed reducer 100 can be reduced in a direction, in which the axis of the crankshaft 120 extends, as compared with a configuration in which at least one of the input gear 150, the transmission gear 160 and the external gear 123 extends completely out of the groove 140a of the carrier 140.

Also, because the transmission gear 160 and the external gear 123 are completely accommodated in the groove 140a of the carrier 140, the eccentrically oscillating speed reducer 100 can prevent the transmission gear 160 and the external gear 123 from being brought into contact with another member, for example, when the eccentrically oscillating speed reducer 100 is singly transported or conveyed, instead of being provided in, for example, an industrial robot.

Incidentally, the joint 10 is configured so that the gap between the base 20 and the crankshaft 120, the gap between the rotating body 30 and the crankshaft 120, and the gap between the case 110 and the disk 141 are sealed with the oil seals 51, 52, and 53, respectively, and that the engaging surface between the base 20 and the case 110 and the engaging surface between the rotating body 30 and the motor 40 are sealed with a seal agent or the like. Thus, the engaging surface between the rotating body 30 and the motor 40 is sealed with the seal agent or the like. Also, the motor 40 is mounted on the rotating body 30. Consequently, a lubricating agent is hermetically sealed in the eccentrically oscillating speed reducer 100.

Second Embodiment

Next, the configuration of a center crank eccentrically oscillating speed reducer 200 according to a second embodiment is described.

Figure 5:
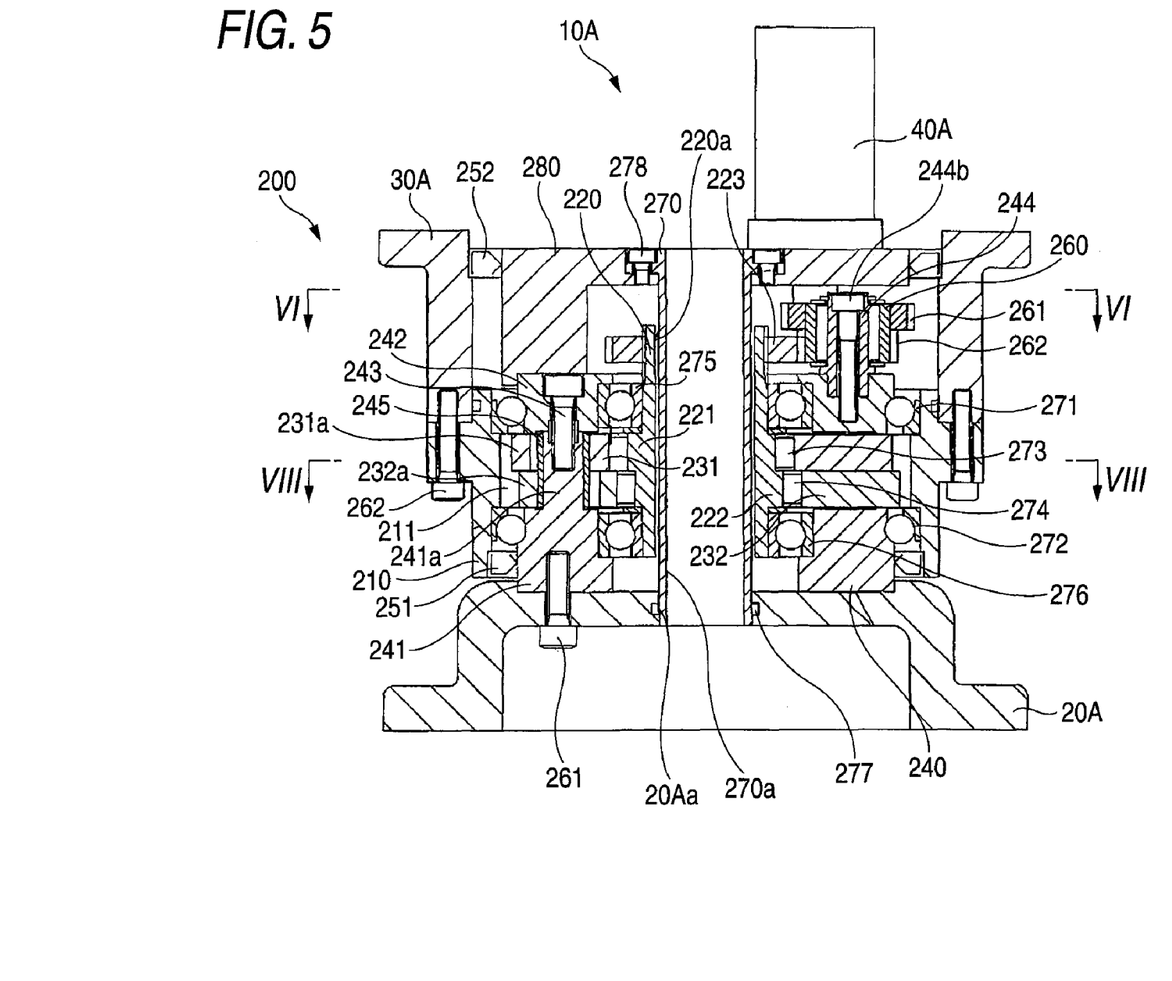
FIG. 5 is a side cross-sectional view illustrating a joint portion of an industrial robot having a center crank eccentrically oscillating speed reducer according to a second embodiment of the invention.

As illustrated in FIG. 5, a joint 10A for use in an industrial robot includes a first arm member 20A, a second arm member 30A which revolves with respect to the first arm member 20A, a barrel 270 which has a bottom part hermetically inserted into and fixed to a hole 20Aa formed in the first arm member 20A with an O-ring 277 and which has a top part fixed with bolts 278 and has also a hollow hole 270a, a motor 40A which is fixed to a motor mounting member 280 with bolts (not shown) and generates power for causing the second arm member 30A to perform relative rotation with respect to the first arm member 20A, and an eccentrically oscillating speed reducer 200 which serves as a center crank eccentrically oscillating speed reducer according to the present embodiment and which is fixed to the first arm member 20A and the second arm member 30A and reduces power generated b the motor 40A so as to use the reduced power as power for moving the second arm member 30A with respect to the first arm member 20A. In the center crank eccentrically oscillating speed reducer according to the present embodiment, the first arm member 20A and the second arm member 30A are configured to be able to perform relative rotation therebetween. According to an application mode, in a case where the second arm member 30A is fixed, the power generated by the motor 40A is output as a rotation of the first arm member 20A. In a case where the first arm member 20A is fixed, the power generated by the motor 40A is output as a rotation of the second arm member 30B.

The eccentrically oscillating speed reducer 200 includes a case 210 which has internal teeth 211 and serves as a first member, a hollow crankshaft 220 which has an eccentric portion 222 and an external gear 223 and is disposed at a substantially center of the internal teeth 211, an external gear 231 which has external teeth 231a meshing with the internal teeth 211 and engages with the eccentric portion 221 of the crankshaft 220 and which is eccentrically moved by the crankshaft 220 and serves as an external gear member, an external gear 232 which has external teeth 232a meshing with the internal teeth 211 and engages with the eccentric portion 222 of the crankshaft 220 and which is eccentrically moved by the crankshaft 220 and serves as an external gear member, a support member 240 which engages with the external gear 231 and enables the external gear 231 to cause the case 210 to perform relative rotation and which serves as a second member, an input gear 250 mounted on an output shaft of the motor 40A, a transmission gear 260 which meshes with the input gear 250 and with the external gear 223 and which transmits to the external gear 223 power having been transmitted from the input gear 250, bearings 271 and 272 which support the case 210 and the support member 240 to be able to perform relative rotation, a bearing 273 which supports the external gear 231 rotatably with respect to the crankshaft 220, a bearing 274 which supports the external gear 232 rotatably with respect to the crankshaft 220, and bearings 275 and 276 which support the crankshaft 220 rotatably with respect to the support member 240.

Figure 6:
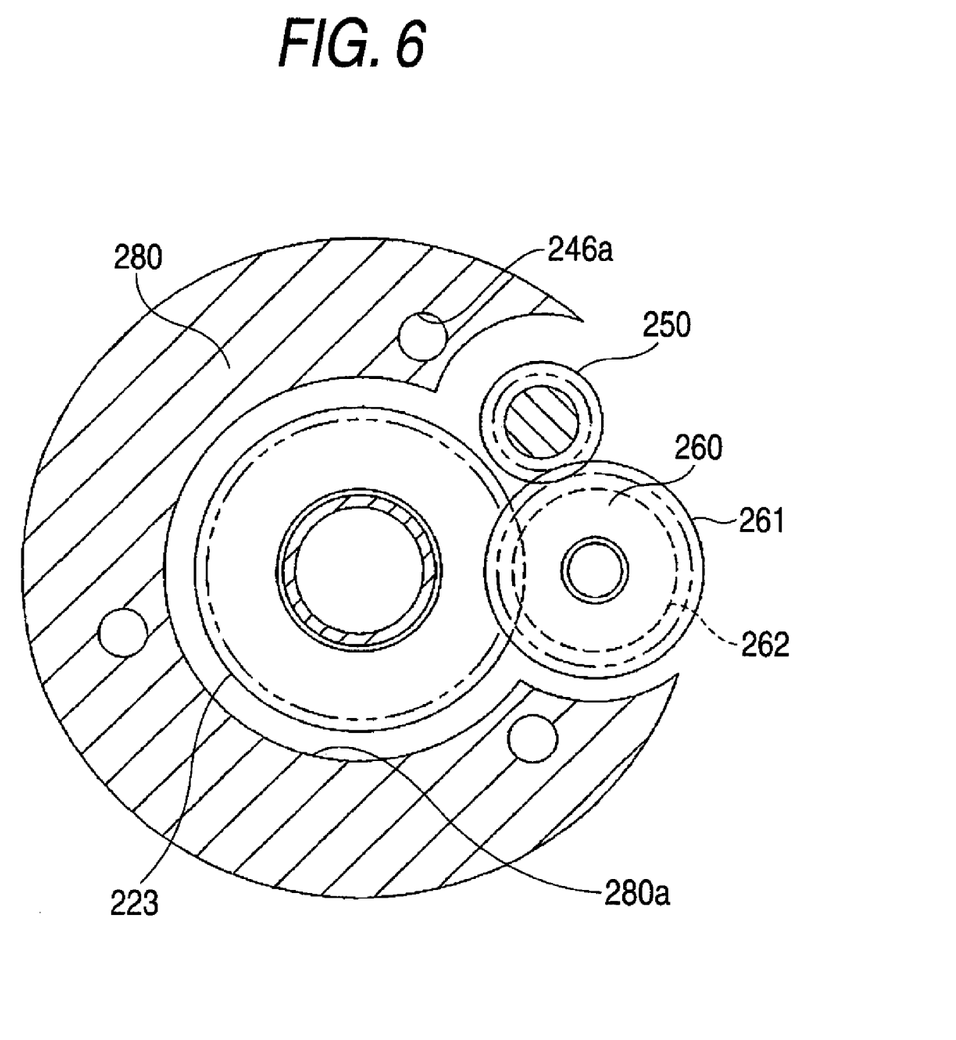
FIG. 6 is a cross-sectional view illustrating the center crank eccentrically oscillating speed reducer, taken in the direction of arrows VI-VI shown in FIG. 5.
Figure 7:
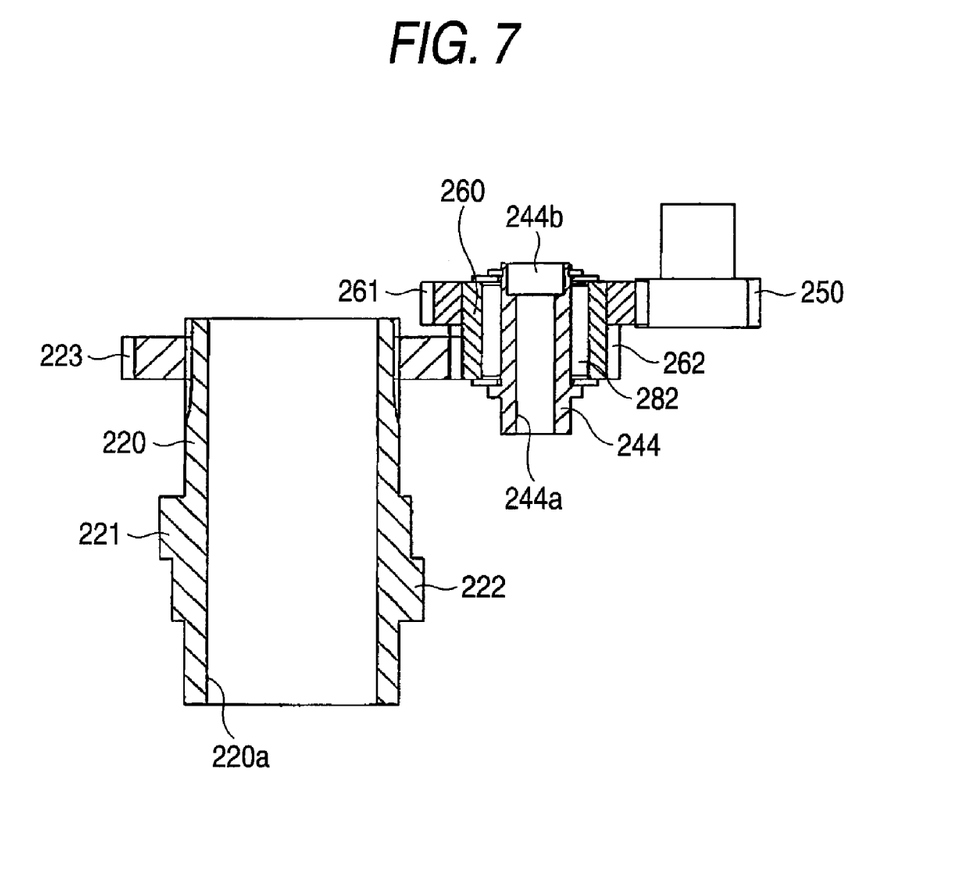
FIG. 7 is an explanatory view illustrating a developed cross-section of each of a motor at the joint portion and a mesh part among an input gear, a transmission gear, and a crankshaft of the center crank eccentrically oscillating speed reducer shown in FIG. 5.

As illustrated in FIGS. 6 and 7, the transmission gear 260 includes a large-diameter gear 261 (a chain double-dashed line indicates the bottom thereof), which is larger in diameter than the input gear 250 mounted on the output shaft of the motor 40A and meshes with this input gear 250, and a small-diameter gear 262 (a dashed line indicates an addendum circle), which is smaller in diameter than the external gear 223 of the crank shaft 220 and meshes this external gear 223. That is, the transmission gear 260 includes a front-stage speed reducing mechanism. Thus, the speed of rotation of the motor 40A is reduced. The rotation, whose speed has been reduced, is input to the external gear 223 of the crank shaft 220. Consequently, the rotation of the motor 40A can be input to the external gear 223 of the crank shaft 220 at a large speed reduction ratio by providing such a front-stage speed reducing mechanism. The input gear 250, the transmission gear 260 and the external gear 223 are accommodated in a concave portion 280a formed in the motor mounting member 280. That is, the input gear 250, the transmission gear 260 and the external gear 223 are accommodated in the second arm member 30A.

The barrel 270 connecting the first arm member 20A and the motor mounting member 280 to each other is internally inserted into the hollow hole 220a of the crankshaft 220.

The support member 240 includes a disk 241 which is formed integrally with pillar portions 241a to be inserted into holes 231b of the external gear 231 and holes 232b of the external gear 232, a disk 242 which is disposed together with the disk 241 so as to be interposed between the external gears 231 and 232, bolts 243 with which the disks 241 and 242 are fastened, and rollers 245, each of which is externally and rotatably inserted onto the periphery of an associated one of the pillar portions 241a so as to rotatably engage the external gears 231 and 232 with the pillar portions 241a. The plural pillar portions 241a, the plural bolts 243, and the plural rollers 245 are disposed on the circumference of a circle centered on the axis of the crankshaft 220 (the number of places, at which these elements are disposed, on this circle is 6 in the present embodiment).

Figure 8:
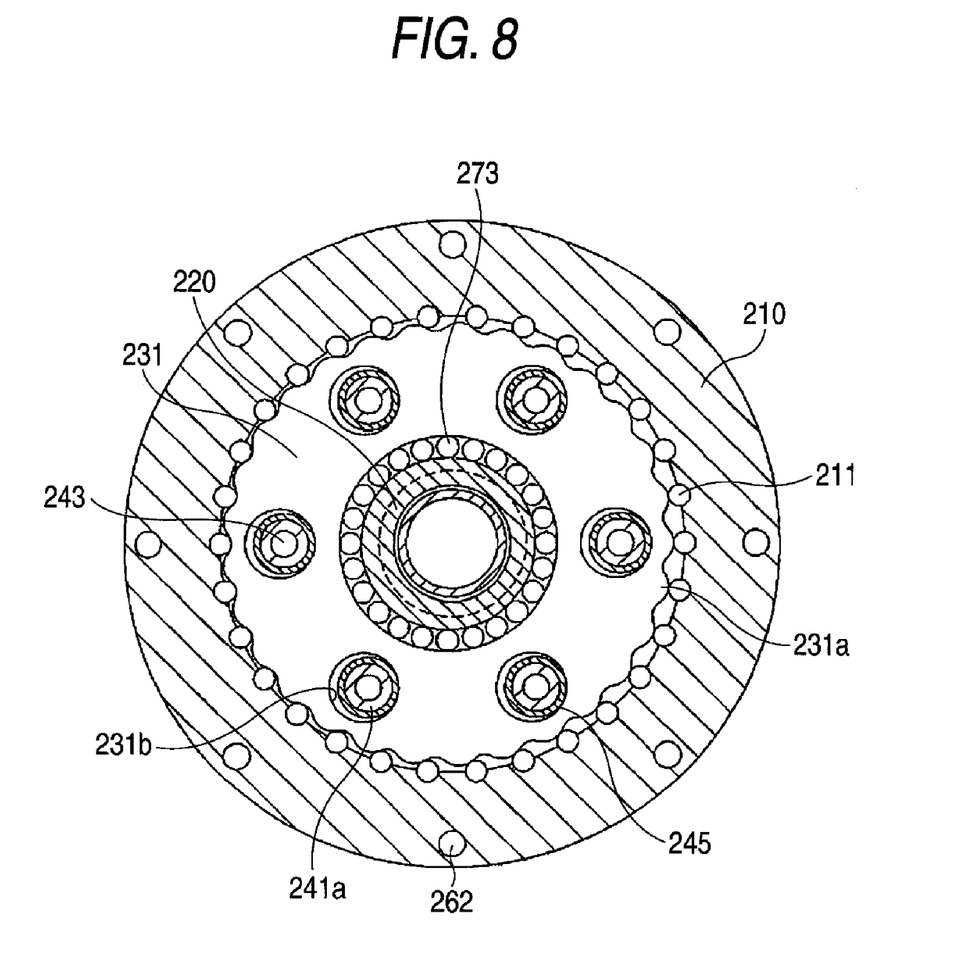
FIG. 8 is a cross-sectional view illustrating the center crank eccentrically oscillating speed reducer, taken in the direction of arrows VIII-VIII shown in FIG. 5.

As illustrated in FIGS. 5 and 8, in this eccentrically oscillating speed reducer 200, the pillar portions 241a inserted into the holes 231b of the external gear 231 and the holes 232b of the external gear 232 are formed integrally with the disk 241 so that the pillar portions 241a engage with the external gears 231 and 232 so as to transmit to the support member 240 torque having been transmitted from the external gears 231 and 232. That is, the pillar portions 241a have not only the function of a member which contributes to the fastening and the positioning of the disk 242 using the bolts 243, but the function of a torque transmission member.

Further, as illustrated in FIGS. 5 and 7, the eccentrically oscillating speed reducer 200 is configured so that the transmission gear 260 is externally inserted onto and is supported by a support shaft 244. A needle bearing 282 is provided between the transmission gear 260 and the support shaft 244. The transmission gear 260 is in rolling contact with and is rotatably supported by the support shaft 244.

Figure 9:
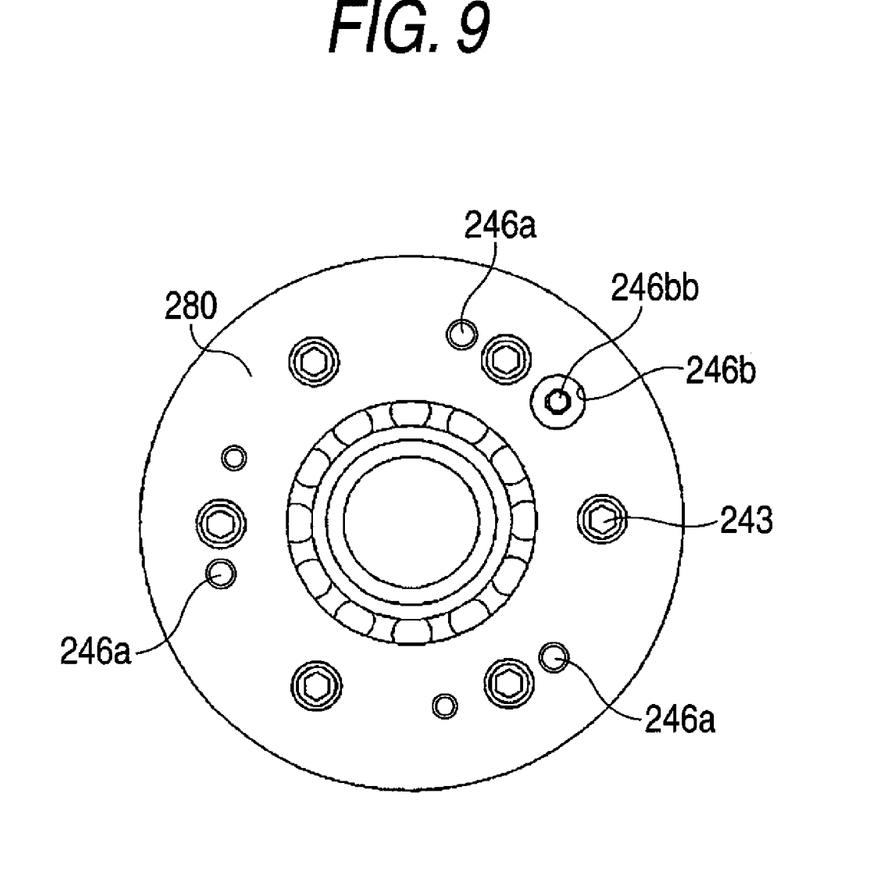
FIG. 9 is a top view illustrating a support member of the center crank eccentrically oscillating speed reducer.

As illustrated in FIG. 9, motor shaft mounting holes 246a (disposed at 3 places arranged in a circumferential direction), a support shaft mounting hole 246b (disposed at a single place) and insertion holes 246c (disposed at 6 places arrange in the circumferential direction), in each of which the bolt 243 is inserted, are formed in the top surface of the support member 240 by being arranged in the circumferential direction. This support shaft 244 is fixed to the support member 240 by screwing a support shaft bolt 244b, which is inserted into a bolt hole 244a formed in the support shaft 244, into a support shaft bolt hole 246bb formed in a support shaft mounting hole 246b. Thus, the transmission gear 260 is supported rotatably with respect to the support member 240.

Incidentally, in the present embodiment, the motor-mounting-member mounting holes 246a and the support shaft bolt hole 246bb are formed as threaded through holes. Therefore, the motor-mounting-member mounting holes 246a and the support shaft bolt hole 246bb can be used as threaded holes into each of which a "snap tap" is inserted.

That is, in a case where the eccentrically oscillating speed reducer 200 is disassembled, sometimes, components are still fit to one another and cannot be manually disassembled even when fastening members, such as the bolts 243, are removed. In such a case, when bolts serving as snap taps are inserted and screwed into these threaded holes, the leading end of each of the bolts butts against an internal member (the external gear 231). When the bolts are more deeply screwed thereinto from this state, a force of pressing the external gear 231 by each of the bolts serving as the snap taps in an axial direction is generated. Thus, a force of separating the disks 241 and 242 from each other or separating the disk 242 from the case 210 can be generated. Such an operation enables the easy disassembly of the support member 240 even in a case where the components are fit to one another.

Further, as illustrated in FIG. 5, the joint 10A includes an oil seal 251 which seals the gap between the disk 2421 of the support member 240 and the case 210, an oil seal 252 which seals the gap between the second arm member 30A and the motor mounting member 280, bolts 261 which fix the first arm member 20A and the support member 240, and bolts 262 which fix the second arm member 30A and the case 210. The oil seals 251 and 252 prevent dusts from externally entering the eccentrically oscillating speed reducer 200, and prevent a lubricating agent from leaking out of the speed reducer 200. Incidentally, the plural bolts 261 and 262 are disposed on the circumference of a circle centered on an axis of the crankshaft 220.

Next, an operation of the joint 10A is described.

When the motor 40A generates power, the power generated by the motor 40A is reduced and transmitted to the crankshaft 220 through the input gear 250 mounted on the output shaft of the motor 40A, the large-diameter gear 261 and the small-diameter gear 262 of the transmission gear 260, and the external gear 223 of the crankshaft 220, and to the external gears 231 and 232 through the eccentric portions 221 and 222 of the crankshaft 220. Moreover, the power is reduced by the external gears 231a and 232a of the external gears 231 and 232 and the internal gear 211 of the case 210. Then, the reduced power is transmitted to the first arm member 20A through the pillar portions 240a (in the case where the second arm member 30A is fixed). Alternatively, the power having been transmitted to the external gears 231 and 232 is transmitted to the case 210 and the second arm member 30B through the external gears 231a and 232a and the internal gear 211 (in the case where the first arm member 20A is fixed).

Accordingly, the support member 240 performs relative rotation with respect to the case 210. The first arm member 20A fixed to the support member 240 performs relative rotation with respect to the second arm member 30A to which the case 210 is fixed.

As described above, the eccentrically oscillating speed reducer 200 includes the transmission gear 260 configured so that the large-diameter gear 261 and the small-diameter gear 262 mesh with the input gear 250 mounted on the output shaft of the motor 40A and the external gear 223 of the crankshaft 220, respectively, to thereby transmit to the external gear 223 the power having been transmitted to the transmission gear 260. Thus, the input gear 250 can be separated apart from the external gear 223. Consequently, as illustrated in FIGS. 5 and 6, the distance between the center of the motor 40A and that of the hollow hole 220a of the crankshaft 120 can be increased; as compared with the conventional center crank eccentrically oscillating speed reducer. Accordingly, the eccentrically oscillating speed reducer 200 can reduce the cross-sectional area of a part of the hollow hole 220a of the crankshaft 220, which is cross-sectionally blocked off by the motor 40A, as compared with the conventional one. Consequently, the eccentrically oscillating speed reducer 100 can increase the available cross-sectional area of the hollow hole 220a, as compared with the conventional one.

Additionally, the transmission gear 260 is constituted by including the large-diameter gear 261 and the small-diameter gear 262. Thus, the eccentrically oscillating speed reducer 200 can more reduce a speed in a front stage. Consequently, the speed reducer 200 can obtain a larger speed reduction ratio.

Further, because the eccentrically oscillating speed reducer 200 can reduce the cross-sectional area of a part of the hollow hole 220a of the crankshaft 220, which is cross-sectionally blocked off by the motor 40A, as compared with the conventional one, it is unnecessary to increase the diameter of the external gear 223 of the crankshaft 220, as compared with the conventional one. Accordingly, the eccentrically oscillating speed reducer 200 can suppress the tapping noises due to the mesh between the transmission gear 260 and the external gear 223 from being turned up. Also, the eccentrically oscillating speed reducer 200 can suppress large noises from being generated, as compared with the conventional one.

Furthermore, the eccentrically oscillating speed reducer 200 is configured so that the pillar portions 241a formed so as to perform the positioning and the fastening of one of a pair of the disks 241 and 242 with respect to the other can be used for transmission of torque having been transmitted from the external gears 231 and 232. Thus, it is unnecessary to additionally provide torque transmission pins or the like in the speed reducer 200. Consequently, the speed reducer 200 can suppress increase in the number of components to be used for transmission of torque.

Additionally, the eccentrically oscillating speed reducer 200 is configured so that the input gear 250, the transmission gear 260 and the external gear 223 are accommodated in the concave portion 280a formed in the motor mounting member 280. Thus, the length of the eccentrically oscillating speed reducer 200 can be reduced in a direction, in which the axis of the crankshaft 220 extends, as compared with a configuration in which at least one of the input gear 250, the transmission gear 260 and the external gear 223 extends completely out of the motor mounting member 280.

Also, because the transmission gear 260 and the external gear 223 are completely accommodated in the concave portion 280a of the motor mounting member 280 and are accommodated in the second arm member 30A, the eccentrically oscillating speed reducer 200 can prevent the transmission gear 260 and the external gear 223 from being brought into contact with another member, for example, when the eccentrically oscillating speed reducer 200 is singly transported or conveyed, instead of being provided in, for example, an industrial robot.

Incidentally, the joint 10A is configured so that the gap between the support member 240 and the case 210, and the gap between the second arm member 30A and the motor support member 280 are sealed with the oil seals 251 and 252, respectively. Consequently, a lubricating agent is hermetically sealed in the eccentrically oscillating speed reducer 200.

INDUSTRIAL APPLICABILITY

As described above, the center crank eccentrically oscillating speed reducer according to the present invention has an advantage in increasing the available cross-sectional area of a hollow hole, while the generation of large noises is suppressed, as compared with the conventional center crank eccentrically oscillating speed reducer. The center crank eccentrically oscillating speed reducer according to the present invention is useful as a center crank eccentrically oscillating speed reducer for use in a joint portion of an industrial machine, such as an industrial robot.

The invention claimed is:

1. A center crank eccentrically oscillating speed reducer, comprising:
   a first member configured to have internal teeth;
   a hollow crankshaft configured to have an external gear, to be disposed at a substantially center of said internal teeth, and to rotate with respect to said first member;
   an external gear member configured to have external teeth meshing with said internal teeth, to engage with said crankshaft and to be eccentrically moved by said crankshaft;

a second member configured to engage with said external gear and to be rotated by said external gear with respect to said first member; and a transmission gear configured to mesh with an input gear and said external gear and to transmit power transmitted from said input gear to said external gear, wherein said transmission gear is rotatably supported by said second member.

2. The center crank eccentrically oscillating speed reducer according to claim 1, wherein said transmission gear has a torque transmission pin to which torque is transmitted from said external gear member; and said transmission gear is rotatably supported by said torque transmission pin.

3. The center crank eccentrically oscillating speed reducer according to claim 2, further comprising:

a bearing disposed between said transmission gear and said torque transmission pin, wherein said torque transmission pin is made of a bearing steel material and has a surface that is a rolling contact surface of said bearing.

4. The center crank eccentrically oscillating speed reducer according to claim 1, wherein the transmission gear is a rotatable external gear train element that has a large-diameter gear which meshes with the input gear and is larger in diameter than the input gear, and that has also a small-diameter gear which meshes with the external gear and is smaller in diameter than the external gear.

* * * * *